United States Patent
Kawamoto (10) Patent No.: US 8,561,789 B2
(45) Date of Patent: Oct. 22, 2013

(54) SORTING APPARATUS

(75) Inventor: Makoto Kawamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/219,471

(22) Filed: Aug. 26, 2011

(65) Prior Publication Data

US 2012/0048686 A1    Mar. 1, 2012

(30) Foreign Application Priority Data

Aug. 30, 2010  (JP) .................................. 2010-191841

(51) Int. Cl.
*B65G 47/34* (2006.01)
(52) U.S. Cl.
USPC .................................. 198/803.13; 198/867.1
(58) Field of Classification Search
USPC ......................................... 198/867.1, 803.13
See application file for complete search history.

(56) References Cited

U.S. PATENT DOCUMENTS

| | | | | |
|---|---|---|---|---|
| 964,166 A | * | 7/1910 | Klink ........................ | 198/803.13 |
| 1,117,311 A | * | 11/1914 | Blair ......................... | 198/803.13 |
| 1,461,746 A | * | 7/1923 | Augustine ................ | 198/803.13 |
| 2,644,473 A | * | 7/1953 | Fox et al. ................. | 198/803.13 |
| 3,032,171 A | * | 5/1962 | Petin ........................ | 198/803.13 |
| 5,653,330 A | * | 8/1997 | Muenker .................. | 198/803.13 |
| 7,533,767 B2 | * | 5/2009 | Hopwood et al. ......... | 198/867.1 |

FOREIGN PATENT DOCUMENTS

| | | |
|---|---|---|
| JP | 1-140379 U | 8/1989 |
| JP | 2-267552 | 11/1990 |
| JP | 2009-092804 | 4/2006 |

* cited by examiner

*Primary Examiner* — James R Bidwell
(74) *Attorney, Agent, or Firm* — Workman Nydegger (57) ABSTRACT

A sorting apparatus sequentially receives and holds a plurality of transported items that are transported and sorts and supports the transported items, and includes an endless movement member disposed so as to form a constant revolving movement pathway, and a plurality of support members that are attached to the movement member so as to be arranged along the direction in which the movement member revolves and that are capable of supporting respective transported items. In a support region that is a region of the revolving movement pathway of the movement member in which the transported items are supported by respective support members, the highest position of the support members decreases the closer the support members are to the downstream side of the direction in which the movement member revolves.

4 Claims, 5 Drawing Sheets

SORTING APPARATUS

The entire disclosure of Japanese Patent Application No: 2010-191841, filed Aug. 30, 2010 is expressly incorporated by reference herein in its entirety.

BACKGROUND

1. Technical Field

The present invention relates to sorting apparatuses that sort transported items such as printed material.

2. Related Art

Ink jet printers are widely known as recording apparatuses that carry out recording processes on recording media (for example, see JP-A-2009-92804). The printer according to JP-A-2009-92804 includes a main printer unit that carries out a printing process (recording process) on printing paper (a transported item) on an order-by-order basis; a transport unit that transports the printing paper on which the printing process has been carried out by the main printer unit in the downstream direction; and a collection unit (sorting apparatus) that sorts and collects the printing paper transported by the transport unit into the individual orders.

The collection unit, meanwhile, includes an endless collection belt (movement member) wound upon rollers so as to form a constant revolving movement pathway, and collection plates (support members) that are held by corresponding holding portions, provided at approximately equal intervals along the outer circumferential surface of the collection belt, in freely-removable states. By causing the collection belt to move in a revolving manner in the downstream direction sequentially, so that a single order is allocated to a single collection plate, the printing paper transported by the transport unit is sorted into individual orders and is then collected by the collection plates on an order-by-order basis.

Incidentally, with the collection unit in the printer disclosed in JP-A-2009-92804, the collection plates into which the printing paper is sorted and collected are disposed so that all of the collection plates have the same height. Accordingly, the collection plates appear to be in a stacked state when viewed from the end of the apparatus (that is, from the downstream direction), and there is thus a problem in that it is difficult to ascertain the collection states of the printing paper that has been collected in the individual collection plates.

SUMMARY

It is an advantage of some aspects of the invention to provide a sorting apparatus in which the support states in which each of transported items are supported by respective support members can be ascertained with ease.

A sorting apparatus according to an aspect of the invention sequentially receives and holds a plurality of transported items that are transported and sorts and supports the transported items, and includes an endless movement member disposed so as to form a constant revolving movement pathway, and a plurality of support members that are attached to the movement member so as to be arranged along the direction in which the movement member revolves to move (hereinafter referred to as "revolves") and that are capable of supporting respective transported items. In a support region that is a region of the revolving movement pathway of the movement member in which the transported items are supported by respective support members, the highest position of the support members decreases the closer the support members are to the downstream side of the direction in which the movement member revolves.

According to this aspect of the invention, the support states in which each of transported items are supported by respective support members can be ascertained with ease by looking at the support region from the downstream side in the direction in which the movement member revolves.

In the sorting apparatus according to another aspect of the invention, in the support region, the movement member forms a revolving movement pathway that is sloped so that the downstream side of the direction in which the movement member revolves is lower than the upstream side of the direction in which the movement member revolves.

According to this aspect of the invention, the support members have the same shape as each other, and thus the support states in which each of transported items is supported by respective support members can be ascertained with ease by looking at the support region from the downstream side in the direction in which the movement member revolves.

In the sorting apparatus according to another aspect of the invention, the support members are transparent or translucent.

According to this aspect of the invention, the transported items supported by the support members can be seen through the support members, and thus the support states in which each of transported items is supported by respective support members can be ascertained with further ease by looking at the support region from the downstream side in the direction in which the movement member revolves.

In the sorting apparatus according to another aspect of the invention, each of the support members is configured of a plate-shaped member that, in the support region, changes orientation from a receiving and holding orientation (hereinafter referred to as "holding orientation"), in which the plate-shaped member receives and holds the transported item in a flat state, to a sorting orientation, in which the plate-shaped member sorts and supports the transported item in an erect state that has been received and held due to the revolving movement of the movement member.

According to this aspect of the invention, the transported items can be received and held by the plate-shaped members in a stable manner, and the transported items can be sorted and supported in a small amount of space after those transported items are received and held.

In the sorting apparatus according to another aspect of the invention, in the support region, the plate-shaped members whose orientations have changed to the sorting orientation are positioned with spaces between each of the plate-shaped members.

According to this aspect of the invention, the transported items can be sorted by the plate-shaped members in a streamlined manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an example in which the invention is embodied as a sorting apparatus that is provided in a printing system and that sorts cut paper that has been printed upon will be described with reference to the drawings. Note that the terms "depth direction", "horizontal direction", and "vertical direction" as used in the descriptions hereinafter refer respectively to the depth direction, horizontal direction, and vertical direction indicated by the arrows in FIG. 1.

Figure 1:
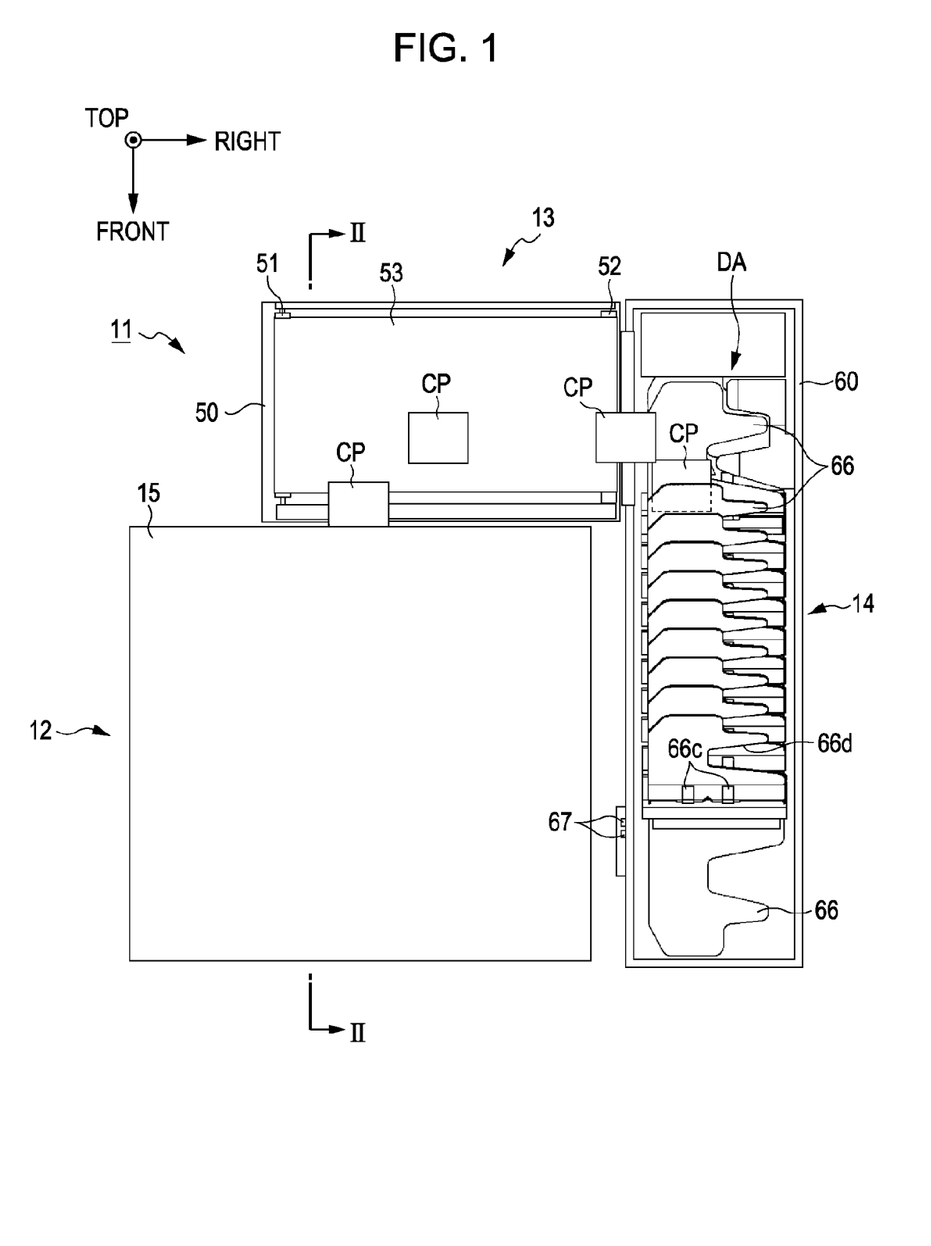
FIG. 1 is a plan view illustrating a printing system according to an embodiment.

As shown in FIG. 1, a printing system 11 includes: an ink jet printer 12, which is a type of recording apparatus; a transport unit 13 that transports cut paper CP, serving as a transported item, that has been printed upon and discharged by the ink jet printer 12; and a sorting apparatus 14 that sequentially receives and holds the cut paper CP transported by the transport unit 13, and that sorts and supports the cut paper CP.

Figure 2:
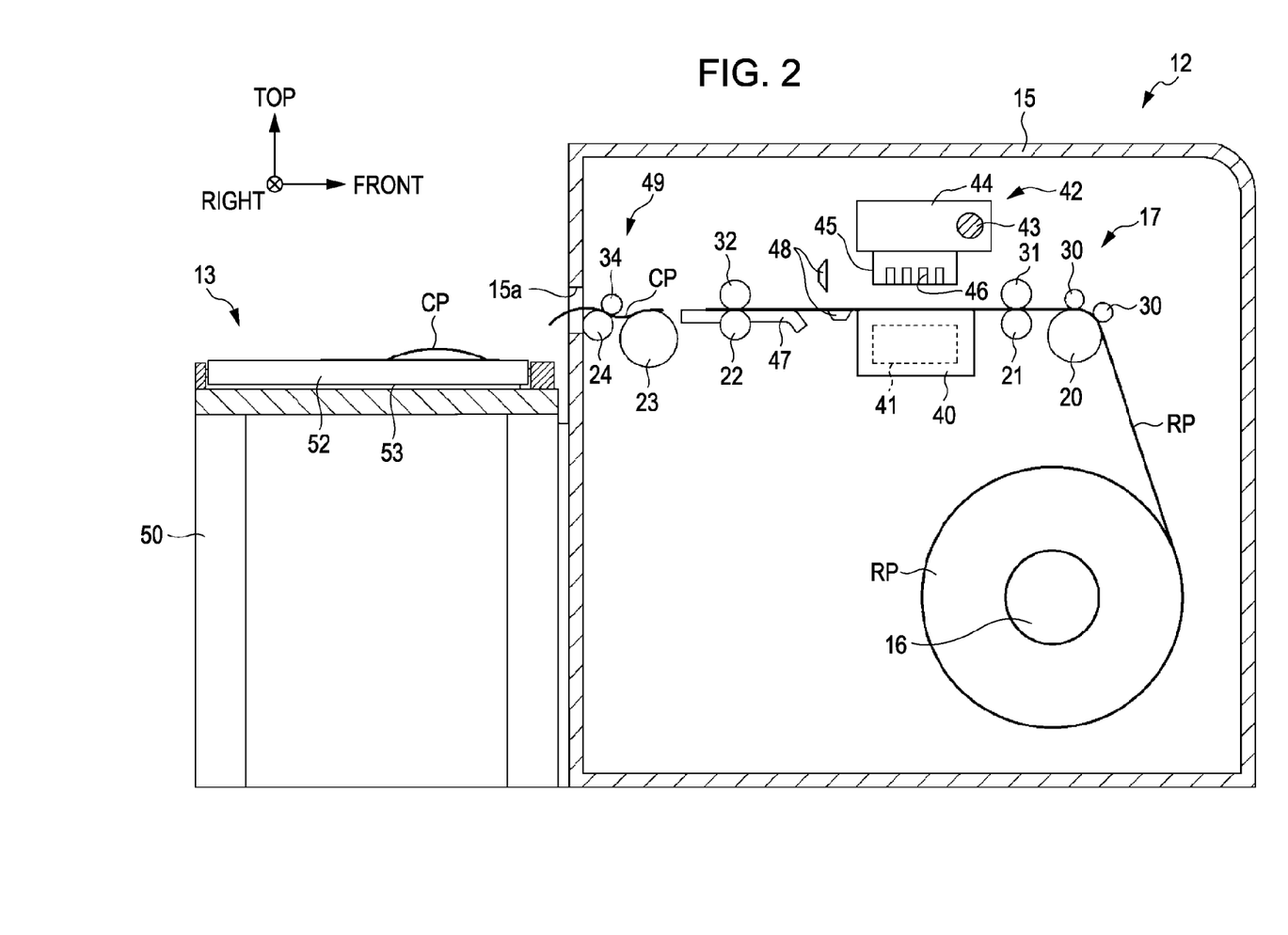
FIG. 2 is a cross-section viewed along the II-II line shown in FIG. 1.

As shown in FIG. 2, the ink jet printer 12 includes an approximately rectangular main case 15 that has a discharge port 15a provided in an upper area of a back wall thereof. A roll of paper RP is disposed in a lower area of the front side of the main case 15, and is supported by a rotating shaft 16 that extends in the horizontal direction so as to rotate along with the rotating shaft 16. The rotating shaft 16 is rotationally driven by a rotating motor (not shown). When the rotating shaft 16 is rotated by the rotating motor (not shown) in the counter-clockwise direction according to FIG. 2, the roll of paper RP is unrolled and let out in the upward direction.

A transport mechanism 17 that leads the roll of paper RP let out from the rotating shaft 16 toward the discharge port 15a is provided in an upper area within the main case 15. The transport mechanism 17 includes: a plurality of transport rollers 20 through 24 that transport the roll of paper RP in an unrolled state along a transport path from the upstream direction to the downstream direction (in this embodiment, from the front to the back); and a plurality of slave rollers 30, 31, 32, and 34 that pinch the unrolled roll of paper RP between the respective transport rollers 20, 21, 22, and 24.

In other words, corresponding transport rollers 20, 21, 22, and 24 and slave rollers 30, 31, 32, and 34 are disposed in positions that oppose each other with the transport path of the unrolled roll of paper RP being located therebetween. Note that the transport rollers 20 through 24 are rotationally driven by a transport motor (not shown).

A support platform 40 that supports the unrolled roll of paper RP from the lower side is disposed between the transport rollers 21 and 22 in the transport path of the roll of paper RP. A plurality of suction holes (not shown) are provided in the upper surface of the support platform 40. Meanwhile, a suction mechanism 41 that sucks the roll of paper RP via the suction holes is provided within the support platform 40. Accordingly, the roll of paper RP supported on the support platform 40 is held on the upper surface of the support platform 40 due to the suction force of the suction mechanism 41.

A recording unit 42 is provided in a position that opposes the support platform 40 with the transport path of the roll of paper RP located therebetween. The recording unit 42 includes: a guide shaft 43 is provided to extend in the horizontal direction within the main case 15; a carriage 44 that is supported by the guide shaft 43 so as to be capable of moving back and forth; and a recording head 45 that is supported on the bottom surface of the carriage 44.

A plurality of nozzles 46 for ejecting ink, serving as a liquid, are opened on the bottom surface of the recording head 45. Printing is carried out onto the roll of paper RP (that is, a recording process is executed) by ejecting ink from the nozzles 46 in the recording head 45 onto the roll of paper RP supported on the upper surface of the support platform 40 while the carriage 44 moves back and forth along the guide shaft 43.

A plate-shaped transport path formation member 47, which forms part of the transport path of the roll of paper RP, is disposed in a location within the main case 15 that corresponds to a location between the transport roller 22 and the slave roller 32. A cutting mechanism 48 for obtaining printed cut paper CP by cutting the areas of the roll of paper RP on which printing has been carried out is provided between the transport path formation member 47 and the support platform 40 in the transport path of the roll of paper RP.

A curl correction mechanism 49 for correcting curls in the cut paper CP is provided between the transport path formation member 47 and the discharge port 15a within the main case 15. The curl correction mechanism 49 includes the transport rollers 23 and 24 and the slave roller 34. When pinching the cut paper CP with the transport roller 24, the slave roller 34 rotates in accordance with the transport of the cut paper CP, and bends the cut paper CP along with the transport roller 23; in this manner, curls in the cut paper CP are corrected.

In this case, the transport roller 23 is disposed upstream from the transport roller 24 in the transport path of the cut paper CP and transports the cut paper CP toward the transport roller 24, and supports the upstream side of the bent portion of the cut paper CP when the cut paper CP is bent. The pieces of cut paper CP whose curls have been corrected by the curl correction mechanism 49 are then sequentially discharged to the transport unit 13 from the discharge port 15a.

As shown in FIGS. 1 and 2, the transport unit 13 transports the cut paper CP discharged from the discharge port 15a of the ink jet printer 12 from the upstream side toward the downstream side of the transport direction thereof (in this embodiment, from the left to the right). The transport unit 13 includes: a base platform 50; rotating rollers 51 and 52, provided so as to form a pair at the left and right ends, respectively, on the base platform 50, and capable of rotation; and an endless transport belt 53 stretched between the rotating rollers 51 and 52.

Of the rotating rollers 51 and 52, the rotating roller 52 disposed on the right side (the downstream side) is rotationally driven by a rotating motor (not shown). As a result of the rotational driving of the rotating roller 52, the transport belt 53 revolves around the outside of the rotating rollers 51 and 52, and the cut paper CP that has been discharged upon the transport belt 53 from the discharge port 15a of the ink jet printer 12 is transported from the left side toward the right side. It should be noted that the discharge port 15a of the ink jet printer 12 is located in a position that is above the transport belt 53 and that corresponds to the left end of the transport belt 53 (the area of the transport belt 53 that is on the upstream side).

As shown in FIG. 1, the sorting apparatus 14 sequentially receives and holds the cut paper CP that has been transported by the transport unit 13, and intermittently transports the received and held cut paper CP from the upstream side toward the downstream side (in this embodiment, from the back to the front) while sorting the cut paper CP into predetermined amounts that have been set in advance. The sorting apparatus 14 includes a case 60, which has a top-opened rectangular box shape that is longer in the depth direction.

Figure 3:
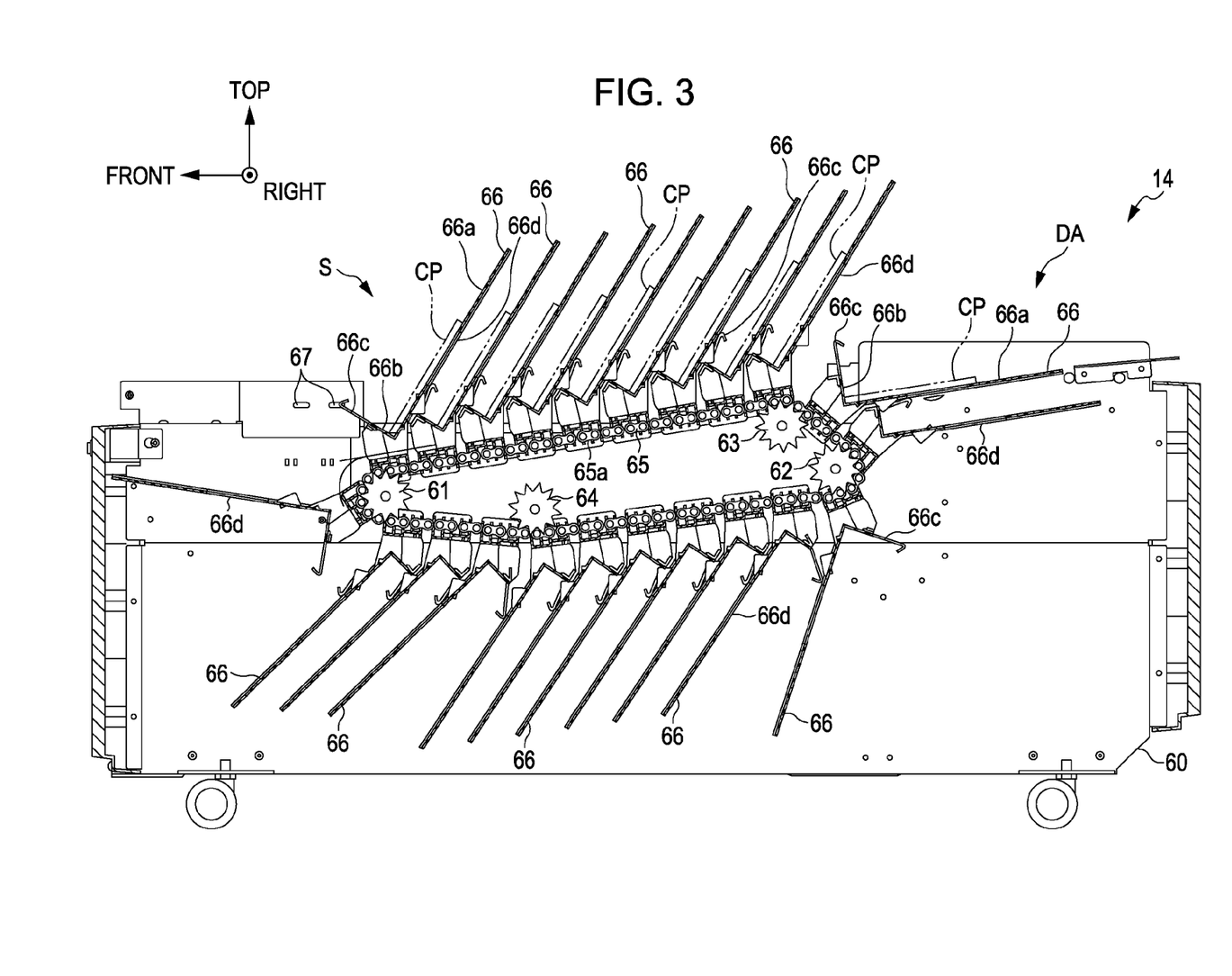
FIG. 3 is a cross-sectional view illustrating a sorting apparatus in the printing system.

As shown in FIG. 3, a driving gear 61 is provided in a location that is forward from the center of the upper area of the case 60, and is provided so as to be capable of rotating central to an axis that extends in the horizontal direction. The driving gear 61 is rotationally driven in the counterclockwise direction shown in FIG. 3 by a driving motor (not shown) provided within the case 60. A first slave gear 62 is provided in a location that is rearward from the center of the upper area of the case 60 and is slightly higher than the driving gear 61, and is provided so as to be capable of rotating central to an axis that extends in the horizontal direction.

In addition, a second slave gear 63 is provided in a position that is above and slantingly forward from the first slave gear 62 in the case 60, and is provided so as to be capable of rotating central to an axis that extends in the horizontal direction. Furthermore, a tension gear 64 is provided in a position that is between the driving gear 61 and the first slave gear 62 in the case 60 and is slightly closer to the driving gear 61, and is provided so as to be capable of rotating central to an axis that extends in the horizontal direction.

A chain 65, serving as an endless movement member, is wound upon the gears 61 through 64 so as to enclose the gears 61 through 64. In other words, the gears 61 through 64 each interlock with the chain 65 from the inside thereof. Furthermore, the tension gear 64 is biased in the downward direction by a spring (not shown). The tension gear 64 being biased in the downward direction by the spring (not shown) makes it possible to take any slack out of the chain 65.

The portion of the chain 65 that extends from the second slave gear 63 to the driving gear 61 serves as a sloped portion 65a that is sloped downward in the forward direction. In this embodiment, the angle of the sloped portion 65a relative to the horizontal plane is set so as to be approximately 20 to 30°. When the driving gear 61 is rotationally driven, the chain 65 makes revolutions around the outside of the gears 61 through 64, in the counterclockwise direction shown in FIG. 3, so as to form a constant revolving movement pathway. In this case, the sloped portion 65a forms a revolving movement pathway in which the downstream side (the forward side) in the direction in which the chain 65 revolves is lower than the upstream side (the rear side) thereof.

A plurality of trays 66, which are L-shaped plates when viewed along a cross-section and serve as plate-shaped members that configure support members, are attached to the outer side of the chain 65 so as to extend outward therefrom, and are provided at equal intervals along the revolving movement direction of the chain 65. Each of the trays 66 is configured of a translucent synthetic resin, and cutout portions 66d are formed in the right sides of holding portions 66a in the trays 66.

The region that is above the driving gear 61 in the sorting apparatus 14 is taken as a support region S in which each of the trays 66 supports respective collections of the cut paper CP. Of this support region S, the region that is essentially to the rear of the second slave gear 63 is taken as a holding region DA, in which the cut paper CP transported from the transport unit 13 is sequentially received and held by respective trays 66.

Each of the trays 66 includes the plate-shaped holding portion 66a that extends in what is essentially the horizontal direction when its tray 66 is positioned at the holding region DA, and a plate-shaped positioning portion 66b that extends upward from the end of the holding portions 66a on the side of the chain 65, perpendicular to the corresponding holding portion 66a. When the tray 66 is positioned at the holding region DA, the holding portion 66a receives and holds the cut paper CP transported from the transport unit 13 in a flat state, and the positioning portion 66b positions the cut paper CP held by the holding portion 66a so as to be positioned on the side of the chain 65.

A pair of left and right regulation portions 66c, which are rectangular plates disposed with a space therebetween, are provided in a central area in the horizontal direction of the tip end of the positioning portion 66b, and are provided so as to be capable of rotating central to an axis that extends in the horizontal direction. Each of the regulation portions 66c is continually biased by a torsion coil spring (not shown) so as to be located in a base position, which is a position that extends parallel to the positioning portion 66b, and does not pivot farther toward the opposite side of the holding portions 66a than the base position.

The tips of the regulation portions 66c are bent at an angle that is greater than the right angle leading into the corresponding holding portion 66a (in this embodiment, the angle is approximately 135°). Note that the orientation of the trays 66 when the trays 66 are in the holding region DA is called a "holding orientation".

Meanwhile, when the portion of the tray 66, in the holding region DA, that is attached to the chain 65 has moved to a position that corresponds to the sloped portion 65a of the chain 65 as a result of the revolution movement of the chain 65, the orientation of that tray 66 is called a "sorting orientation". When the tray 66 is in the sorting orientation, the positioning portion 66b thereof moves downward, and thus the cut paper CP received and held in the holding region DA is held by the positioning portion 66b while leaning against the holding portion 66a. In other words, when the trays 66 are in the sorting orientation, the trays 66 hold the cut paper CP in a standing state.

In this embodiment, nine trays 66 are arranged above the sloped portion 65a of the chain 65. In other words, the sorting apparatus 14 is set so that there are always nine trays 66 in the sorting orientation, even if the chain 65 revolves.

Figure 4:
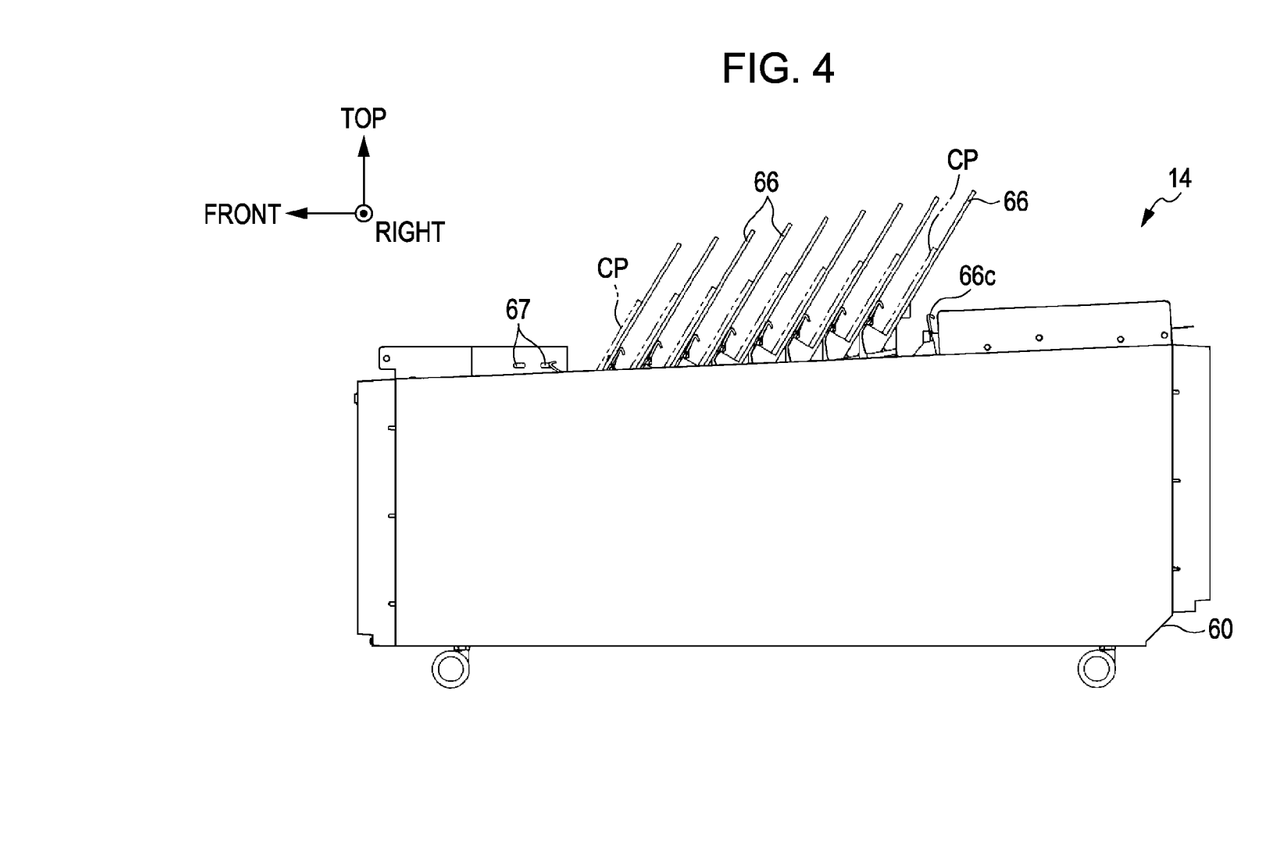
FIG. 4 is a right-side view of the sorting apparatus.
Figure 5:
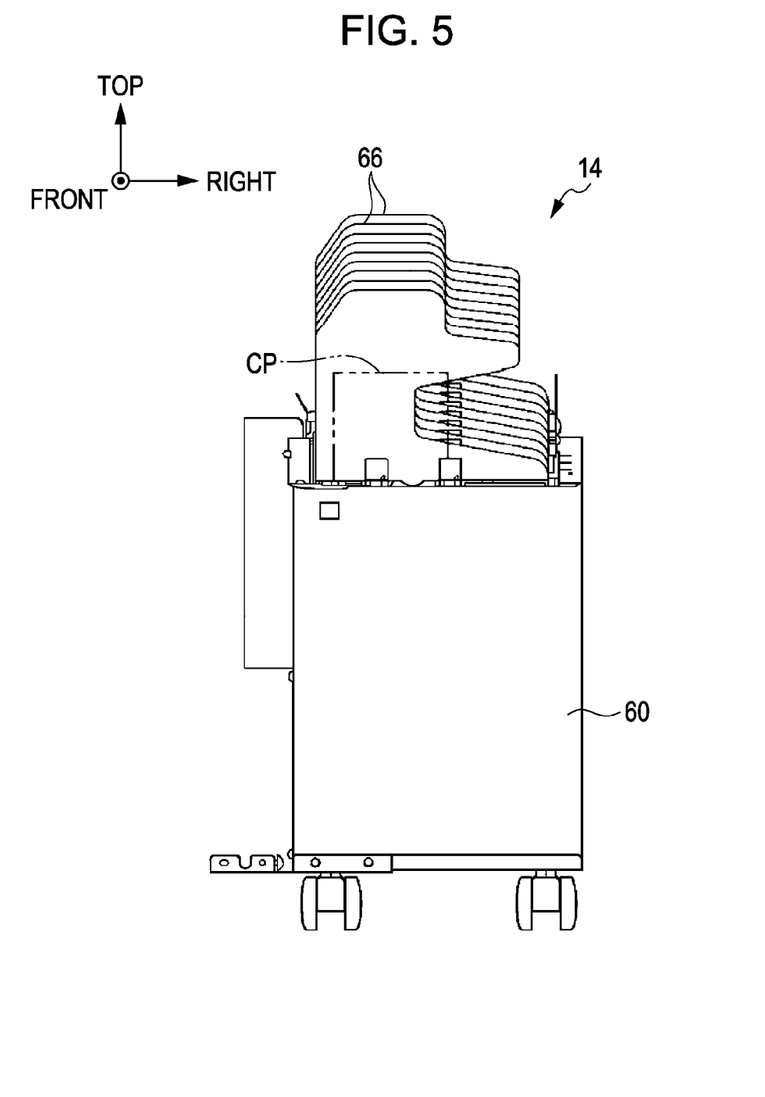
FIG. 5 is a front view of the sorting apparatus.

Because the sloped portion 65a is sloped so that the downstream side (the forward side) in the direction in which the chain 65 revolves is lower than the upstream side (the rear side) thereof as described above, the positions of the upper ends of the holding portions 66a of the trays 66 (that is, the highest positions) that are in the sorting orientation within the support region S become lower as they move further downstream (forward) in the direction in which the chain 65 revolves. Accordingly, as shown in FIGS. 4 and 5, when a user views the sorting apparatus 14 from the front, the user can see the upper ends of all of the trays 66 that are in the sorting orientation.

As shown in FIG. 3, the trays 66 that are in the sorting orientation are positioned with spaces between the respective holding portions 66a thereof. In this case, the regulation portions 66c in the trays 66 make contact with the respective holding portions 66a of the trays 66 that are adjacent thereto on the downstream side in the direction in which the chain 65 revolves; as a result, the regulation portions 66c pivot, against the biasing force of the torsion coil springs (not shown), to a position that is essentially parallel to the holding portions 66a that the regulation portions 66c make contact with.

Note that of the trays 66 in the sorting orientation, the regulation portions 66c of the tray 66 that is positioned furthest downstream (furthest forward) in the direction in which the chain 65 revolves do not make contact with the tray 66 that is adjacent thereto on the downstream side in the direction in which the chain 65 revolves, and therefore the base position is maintained by the biasing force of the torsion coil spring (not shown).

In addition, an optical sensor 67 is provided slightly forward from the tray 66 that, of the trays 66 that are in the sorting orientation at the upper end of the left wall of the case 60, is positioned furthest forward (on the downstream side in the direction in which the chain 65 revolves), in order to detect the presence/absence of the cut paper CP supported by that tray 66. The optical sensor 67 is electrically connected to a control unit (not shown) that controls the overall operational state of the printing system 11, and the control unit controls the operational state of the printing system 11 based on output signals from the optical sensor 67.

Next, operations of the sorting apparatus 14 will be described.

When the printing system 11 is operated, the printed cut paper CP that is sequentially discharged from the discharge port 15a of the ink jet printer 12 is sequentially transported toward the holding region DA of the sorting apparatus 14 by the transport unit 13. The cut paper CP that is sequentially transported from the transport unit 13 is then sequentially received and held by the holding portion 66a of the tray 66 of the sorting apparatus 14 that is in the holding orientation in the holding region DA.

At this time, the tray 66 that is in the holding orientation is positioned in a sloped manner so that the holding portion 66a thereof slopes slightly downward, in the forward direction, relative to the horizontal plane, and therefore the cut paper CP that is sequentially received and held by the holding portion 66a slides down in the forward direction and makes contact with the positioning portion 66b. Accordingly, the pieces of cut paper CP that are received and held by the holding portion 66a are positioned so that their front ends are aligned. At this time, the regulation portions 66c are in the base position, and thus the cut paper CP is prevented, by the regulation portions 66c, from passing over the positioning portion 66b and falling out of the tray 66.

When a predetermined number of sheets that has been set in advance (for example, 50 sheets) of the cut paper CP has been received and held by the tray 66 that is in the holding orientation, the chain 65 revolves by an amount equivalent to one tray 66, and then stops. Accordingly, the orientation of the tray 66 that has received and holds the predetermined number of sheets of cut paper CP at the holding region DA changes from the holding orientation to the sorting orientation.

At this time, the regulation portions 66c of the tray 66 whose orientation has been changed to the sorting orientation make contact with the holding portion 66a of the tray 66 that is located forward (that is, is adjacent on the downstream side) thereto, and thus the regulation portions 66c pivot, against the biasing force of the torsion coil spring (not shown), to a position that is essentially parallel to the holding portion 66a. Accordingly, the gap between the tray 66 whose orientation has been changed to the sorting orientation and the tray 66 that is forward therefrom is filled by the regulation portions 66c, and thus the cut paper CP that is held in the tray 66 is suppressed from falling through that gap.

Furthermore, the regulation portions 66c of the tray 66 whose orientation has been changed to the sorting orientation pivot to a position that is essentially parallel to the holding portion 66a that the regulation portions 66c make contact with, which suppresses a wasteful space equivalent to the length of the regulation portions 66c from being formed between trays 66 that are in the sorting orientation.

Continuing on, the cut paper CP that is sequentially transported from the transport unit 13 is then sequentially received and held by the holding portion 66a of the tray 66 of the sorting apparatus 14 that is in the holding orientation in the holding region DA. When the predetermined number of sheets of the cut paper CP are received and held by that tray 66, the chain 65 revolves by an amount equivalent to a single tray 66, and then stops. Accordingly, the orientation of the tray 66 that has received and held the predetermined number of sheets of cut paper CP at the holding region DA changes from the holding orientation to the sorting orientation.

In this manner, when each of the trays 66 receives and holds the predetermined number of sheets of cut paper CP at the holding region DA, the orientations thereof are sequentially changed from the holding orientation to the sorting orientation in accordance with the revolving movement of the chain 65. When the nine trays 66 that support the predetermined number of sheets of the cut paper CP in the sorting orientation move above the sloped portion 65a of the chain 65, the cut paper CP is held (supported) by the respective trays 66, with the predetermined number of sheets of cut paper CP being sorted into each of the nine trays 66.

At this time, the cut paper CP that is supported by the tray 66 that, of the nine trays 66 that are in the sorting orientation, is positioned furthest forward (that is, on the downstream side in the direction in which the chain 65 revolves), is detected by the optical sensor 67. When the printing of the predetermined number of sheets of cut paper CP that are to be held in the tenth tray 66 that is in the holding orientation in the holding region DA has finished, and it has been determined that the cut paper CP is still being detected by the optical sensor 67, the control unit (not shown) stops the ink jet printer 12 from printing onto the cut paper CP.

After this, when at least the cut paper CP supported by the tray 66 that, of the nine trays 66 that are in the sorting orientation, is positioned furthest forward has been removed by the user, the cut paper CP is no longer detected by the optical sensor 67. Accordingly, the control unit (not shown) causes the ink jet printer 12 to resume printing on the cut paper CP.

In this manner, with the printing system 11, the printed cut paper CP that is sequentially transported from the transport unit 13 is sorted by the sorting apparatus 14 into groups of a predetermined number of sheets, which are then removed by the user. At this time, the sloped portion 65a of the chain 65 is sloped so that the downstream side (the forward side) in the direction in which the chain 65 revolves is lower than the upstream side (the rear side) thereof, and thus the upper ends of all of the trays 66 that are in the sorting orientation and hold the cut paper CP that has been sorted into the groups of the predetermined number of sheets can be seen, even when the user views the sorting apparatus 14 from the front.

Accordingly, because the user can easily ascertain how the sorting apparatus 14 has sorted the cut paper CP from the front of the sorting apparatus 14, the user can efficiently remove the cut paper CP that has been sorted by the sorting apparatus 14.

According to the embodiment described in detail thus far, the following effects can be achieved.

1. In the sorting apparatus 14, with the trays 66 that are in the sorting orientation within the support region S, the positions of the upper ends of the holding portions 66a of the trays 66 (that is, the highest positions) become lower as they move further downstream (forward) in the direction in which the chain 65 revolves. Accordingly, the user can see the upper ends of all of the trays 66 that are in the sorting orientation from the front of the sorting apparatus 14. As a result, because the user can easily ascertain how the sorting apparatus 14 has sorted the cut paper CP from the front of the sorting apparatus 14, the user can efficiently remove the cut paper CP that has been sorted by the sorting apparatus 14.

2. In the sorting apparatus 14, the sloped portion 65a of the chain 65, which supports the trays 66 that are in the sorting orientation within the support region S, forms a revolving movement pathway in which the downstream side (the forward side) in the direction in which the chain 65 revolves is lower than the upstream side (the rear side) thereof. Accordingly, setting the trays 66 to have the same shape as each other makes it possible for the user to see the upper ends of all of the trays 66 that are in the sorting orientation from the front of the sorting apparatus 14. As a result, the user can easily ascertain how the sorting apparatus 14 has sorted the cut paper CP from the front of the sorting apparatus 14.

3. In the sorting apparatus 14, the trays 66 are configured of a translucent synthetic resin, and thus the user can see the cut paper CP that has been sorted and is held by the trays 66 that are in the sorting orientation within the support region S through the trays 66, from the front of the sorting apparatus 14. Accordingly, the user can even more easily ascertain how the sorting apparatus 14 has sorted the cut paper CP from the front of the sorting apparatus 14.

4. In the sorting apparatus 14, the trays 66 change orientation from the holding orientation, in which the trays 66 receive and hold the cut paper CP in a flat state within the support region S, to the sorting orientation, in which the trays 66 sort and support the cut paper CP in an erect state in accordance with the revolving movement of the chain 65. Accordingly, the cut paper CP can be received and held by the trays 66 in a stable manner, and the cut paper CP can be sorted and supported in a small amount of space after that cut paper CP is received and held.

5. In the sorting apparatus 14, the trays 66 whose orientations have been changed from the holding orientation to the sorting orientation within the support region S are parallel to each other, and thus the cut paper CP can be sorted by the trays 66 in a streamlined manner.

Variations

The aforementioned embodiment may be changed to the embodiments described hereinafter as well.

In the sorting apparatus 14, it is not absolutely necessary for the trays 66 in the sorting orientation to be parallel to each other.

In the sorting apparatus 14, the number of trays 66 that take on the sorting orientation may be changed to any desired number as long as that number is 2 or greater.

In the sorting apparatus 14, the trays 66 may be formed as top-opened boxes.

In the sorting apparatus 14, the trays 66 may be configured using an opaque material.

In the sorting apparatus 14, the trays 66 may be configured of a material aside from a synthetic resin, such as wood, metal, rubber, glass, stone, or the like.

In the sorting apparatus 14, the sloped portion 65a of the chain 65 may be set to be horizontal, and the trays 66 in the sorting orientation may have their angle of slope relative to the horizontal plane adjusted so that the positions of the upper ends of the holding portions 66a (the highest positions) become lower as the trays 66 approach the downstream side (the front) in the direction in which the chain 65 revolves. In other words, the sloped portion 65a of the chain 65 may be set to be horizontal, and the angle of slope of the trays 66 in the sorting orientation relative to the horizontal plane may be reduced as the trays 66 approach the downstream side (the front) in the direction which the chain 65 revolves.

The sorting apparatus 14 may be used to sort transported items aside from the cut paper CP. In other words, the sorting apparatus 14 may be used in order to sort transported items that are significantly thicker than the cut paper CP (for example, books or the like). In this case, it is necessary to change the strength, shape, and so on of the trays 66 as appropriate in order to enable such thick transported items to be sorted and supported.

In the printing system 11, plastic film, cloth, metal foil, or the like may be employed as the transported items instead of the cut paper CP.

In the above embodiment, the recording apparatus is embodied as the ink jet printer 12, but a liquid ejecting apparatus that ejects or expels another liquid aside from ink may be employed as well. The invention can also be applied in various types of liquid ejecting apparatuses including liquid ejecting heads that eject minute liquid droplets. Note that "droplet" refers to the state of the liquid ejected from the liquid ejecting apparatus, and is intended to include granule forms, teardrop forms, and forms that pull tails in a string-like form therebehind. Furthermore, the "liquid" referred to here can be any material capable of being ejected by the liquid ejecting apparatus. For example, any matter can be used as long as the matter is in its liquid state, including liquids having high or low viscosity, sol, gel water, other inorganic agents, inorganic agents, liquid solutions, liquid resins, and fluid states such as liquid metals (metallic melts); furthermore, in addition to liquids as a single state of a matter, liquids in which the molecules of a functional material composed of a solid matter such as pigments, metal particles, or the like are dissolved, dispersed, or mixed in a liquid carrier are included as well. Ink, described in the above embodiment as a representative example of a liquid, liquid crystals, or the like can also be given as examples. Here, "ink" generally includes water-based and oil-based inks, as well as various types of liquid compositions, including gel inks, hot-melt inks, and so on. The following are specific examples of liquid ejecting apparatuses: liquid ejecting apparatus that eject liquids including materials such as electrode materials, coloring materials, and so on in a dispersed or dissolved state for use in the manufacture and so on of, for example, liquid-crystal displays, EL (electroluminescence) displays, front emission displays, and color filters; liquid ejecting apparatuses that eject bioorganic matters used in the manufacture of biochips; liquid ejecting apparatuses that eject liquids to be used as samples for precision pipettes; printing equipment and microdispensers; and so on. Furthermore, the invention may be employed in liquid ejecting apparatuses that perform pinpoint ejection of lubrication oils into the precision mechanisms of clocks, cameras, and the like; liquid ejecting apparatuses that eject transparent resin liquids such as ultraviolet light-curable resins onto a substrate in order to form miniature hemispheric lenses (optical lenses) for use in optical communication elements; and liquid ejecting apparatus that eject an etching liquid such as an acid or alkali onto a substrate or the like for etching. The invention can be applied to any type of these liquid ejecting apparatuses.

What is claimed is:

1. A sorting apparatus that sequentially receives and holds a plurality of transported items that are transported and sorts and supports the transported items, the apparatus comprising:
   an endless movement member disposed so as to form a revolving movement pathway; and
   a plurality of support members that are attached to the movement member so as to be arranged along the direction in which the movement member revolves and that are capable of supporting respective transported items, wherein the support members are transparent or translucent,
   wherein in a support region that is a region of the revolving movement pathway of the movement member in which the transported items are supported by respective support members, the support region having a first end that is adjacent to a holding region and a second end where transported items are removed that is on a downstream side in the direction that the movement member revolves, the highest position of the support members is adjacent to the first end, and decreases the closer the support members are to the second end.

2. The sorting apparatus according to claim 1, wherein in the support region, the movement member forms a revolving movement pathway that is sloped so that the downstream side of the direction in which the movement member revolves is lower than the upstream side of the direction in which the movement member revolves.

3. The sorting apparatus according to claim 1, wherein each of the support members is configured of a plate-shaped member that, in the support region, changes orientation from a holding orientation, in which the plate-shaped member receives and holds the transported item in a flat state, to a sorting orientation, in which the plate-shaped member sorts and supports the transported item in an erect state that has been received and held due to the revolving movement of the movement member.

4. The sorting apparatus according to claim 3, wherein in the support region, the plate-shaped members whose orientations have changed to the sorting orientation are positioned with spaces between each of the plate-shaped members.

* * * * *